United States Patent Office 3,524,628
Patented Aug. 18, 1970

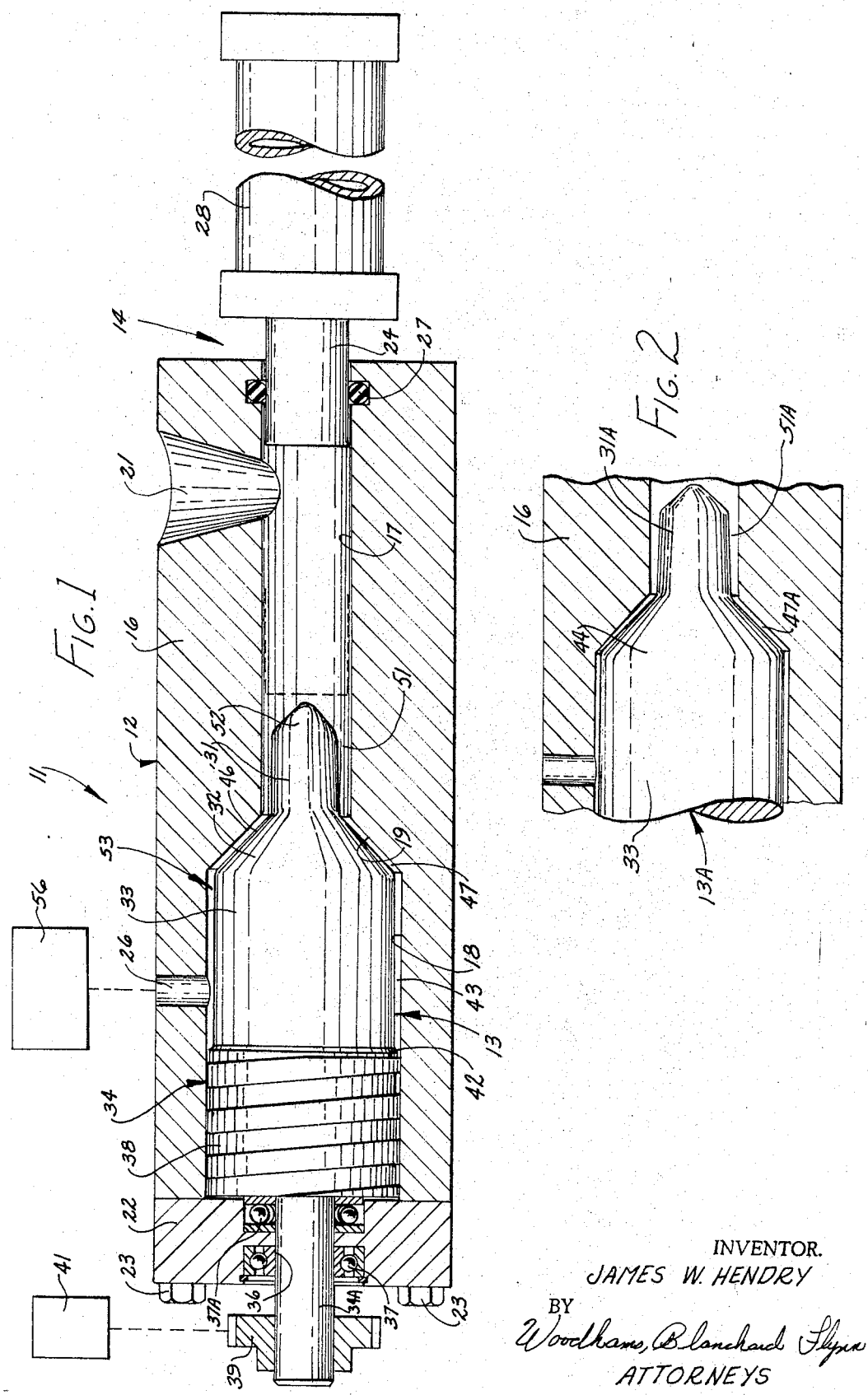

3,524,628
CONICAL ROTOR WITH ELONGATED NOSE PORTION
James W. Hendry, Helena, Ohio, assignor to Borg-Warner Corporation, Chicago, Ill., a corporation of Delaware
Filed May 1, 1968, Ser. No. 725,800
Int. Cl. B01f 7/12
U.S. Cl. 259—10           9 Claims

ABSTRACT OF THE DISCLOSURE

A plasticizing apparatus comprising a feed barrel having an opening extending therethrough. Said opening comprises feeding and preheating portions of relatively small, and usually the same, diameters, a plasticizing portion of progressively increasing diameter and an equalizing or soaking portion of enlarged, usually constant, diameter. A pressure feed member is provided in the feeding portion of said opening. A rotor is provided rotatably within the remainder of said opening, same comprising a relatively small portion within said preheating portion of the opening, a conical portion within, and facing the wall defining, the plasticizing portion of the opening and a relatively large, usually cylindrical, portion within the enlarged portion of the opening to provide a heat equalizing or soaking zone. The pressure feed member feeds and compresses particulate plastic material into the preheating zone for preheating and then into the conical plasticizing zone for plasticizing, the plasticized material then being propelled through the soaking zone and discharged adjacent the other end thereof.

FIELD OF THE INVENTION

The present invention relates to a plasticizing apparatus wherein a pressure feed member feeds and compresses particulate plastic material into a plasticizing region adjacent a rotating plasticizing element, the plasticizing element heating and melting the plastic material adjacent the surface thereof, the plasticized material then being fed to a conventional injection or extrusion device.

BACKGROUND OF THE INVENTION

Plastic materials used in injection molding, including both thermoplastic and thermosetting types, vary widely in their ability to tolerate elevated temperatures. Some otherwise desirable plastic materials, such as unplasticized polyvinyl chloride, polyoxymethylene and acrylonitrile-butadiene-styrene (ABS) copolymers are moldable only over a particular limited temperature range. Thus, careful control is required to maintain such materials in a moldable condition since a small drop in temperature makes same unmoldable while a small rise in temperature results in decomposition of the material, as through charring. Further, some plastic materials decompose or char if maintained at an elevated temperature for any substantial period of time. Thus, careful control is also required of these materials so as to insure that the material is rapidly heated to the molding temperature, injected into the mold, and cooled before the material begins to decompose.

Decomposition of the plastic material has often occurred in many of the previously known plasticizing machines. Some such decomposition has been caused by uneven working of the material within the plasticizing machine. Such uneven working causes variations in the temperature whereupon some of the material substantially exceeds the desired molding temperature, thus, causing decomposition or charring to occur. In other plasticizing machines, the material is not rapidly discharged from the machine after being heated to the desired molding temperature and some of the material tends to become trapped in the machine, whereupon the material may be maintained at the molding temperature for excessive periods of time and thus may decompose or char. The decomposed material is often in the form of small flecks of black char entrained in the moldable material to produce a defective molded product. Since the flecks are small, a large number of such defective molded parts may be produced before the faulty operation of the plasticizing machine is discovered, resulting in much expensive wastage.

To provide for precise control of the plasticizing operation and thereby to prevent decomposition and charring of the material, one recent plasticizing machine has employed a rotating element which has a conical portion on the end thereof, which portion is closely surrounded by a stationary seat portion. The particulate material is forced through a small passageway between the stationary seat and the rotating conical portion whereby frictional heat is generated between the material and the surface of the conical rotor, causing the material to be plasticized. Such a machine, as illustrated in my prior U.S. Pat. No. 3,358,334, has been very successful in permitting more precise control of the plasticizing operation since the rotor speed can be precisely controlled and the rotor can be intermittently operated to thereby permit accurate control of the amount of frictional heat generated during the plasticizing operation.

However, it has been discovered that use of the above machine on certain types of plastics, especially highly viscous plastic materials, does not always result in a completely uniform plastification of the particulate plastic material. When such a machine is used with highly viscous materials, the material tends to adhere or stick to the stationary housing or seat surrounding the rotor so that relative rotation exists only between the periphery of the rotor and the adjacent periphery of the quantity of material surrounding same. Consequently, all of the frictional heat generated by the rotor is supplied to the quantity of material at the inside diameter thereof, which heat must then be transferred radially outwardly by conduction throughout the thickness of the material so as to effect complete plasticizing thereof. Thus, this tendency for the material to stick or adhere to the seat often prevents the material directly adjacent the seat from becoming completely heated and plasticized.

On the other hand, when an attempt is made to completely plasticize the material adjacent the seat by permitting the rotor to remain in rotational contact with the material for a longer period of time, thereby generating a greater amount of frictional heat, the greater amount of heat generated tends to char or decompose the material closely adjacent the rotor and thus destroys the purity of the material.

To overcome the above disadvantages, the annular passageway between the stationary seat and the plasticizing rotor in the above-mentioned machines has been made relatively small to permit the material contained therein to be rapidly heated throughout the thickness thereof so as to cause complete plasticizing of the material without causing charring or decomposing of the material adjacent the rotor. While this has been successful in preventing decomposition of the material, it greatly limits the amount of material which can be plasticized by the machine within a specified time.

Accordingly, the objects of the present invention are to provide:

(1) An improved plasticizing apparatus capable of plasticizing materials, particularly capable of plasticizing heat-sensitive or highly viscous materials, without appreciable damage to the material.

(2) An apparatus, as aforesaid, suitable for either continuous or batch-type production and capable of plasticizing and heating to molding temperature large quantities of material without causing appreciable damage to the material.

(3) An apparatus, as aforesaid, wherein the material is heated and plasticized in a plurality of stages so as to prevent appreciable damage to the material.

(4) An apparatus, as aforesaid, wherein the particulate plastic material is initially heated to a temperature below, usually only slightly below, the plastification temperature and is maintained at this temperature for a period of time to permit the material to achieve a substantially uniform temperature throughout.

(5) An apparatus, as aforesaid, wherein the preheated material is rapidly plasticized to prevent deterioration or charring of the material.

(6) An apparatus, as aforesaid, wherein the material is heated and plasticized by a plasticizing rotor having first and second cylindrical, or at least approximately cylindrical, portions interconnected by a conical portion, the first portion being of substantially smaller diameter than the second portion.

(7) An apparatus, as aforesaid, wherein the material is preheated by the first portion with the material travelling axially along the periphery of same for a period of time whereby the material achieves a substantially uniform temperature.

(8) An apparatus, as aforesaid, wherein the plasticized material adjacent the first cylindrical portion is then compressed against the conical portion to rapidly frictionally heat and plasticize same.

Other objects and purposes of the invention will be apparent to persons acquainted with machines of this general type upon reading the following disclosure and inspecting the accompanying drawings.

BRIEF DESCRIPTION OF THE DRAWINGS

FIG. 1 illustrates a partially broken side elevational view, partially in cross section, of a plasticizing machine employing therein an improved plasticizing rotor according to the present invention.

FIG. 2 is a fragmentary view similar to FIG. 1 and showing a modification.

Certain terminology will be used in the following description for convenience in reference only and will not be limiting. The words "upwardly," "downwardly," "rightwardly" and "leftwardly" will designate directions in the drawing to which reference is being made. The word "forwardly" will refer to the normal direction of the material flow through the device. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing a plasticizing apparatus wherein particulate plasticizing material is fed to an annular plasticizing zone as defined by a rotor and a surrounding seat member, relative rotation existing between the rotor and the seat, and preheating means are provided ahead of said plasticizing zone. There is provided a housing having an opening therethrough, which opening comprises feeding and preheating portions of relatively small, and usually the same, diameters, a plasticizing portion of progressively increasing diameter and an equalizing or soaking portion of enlarged, usually constant, diameter. A pressure feed member is provided in the feeding portion of said opening. A rotor is provided rotatably within the remainder of said opening, same comprising a relatively small portion within said preheating portion of the opening, a conical portion within, and facing the wall defining, the plasticizing portion of the opening and a relatively large, usually cylindrical, portion within the enlarged portion of the opening to provide a heat equalizing or soaking zone. Pressure feed means, such as a ram, causes a quantity, either batch or continuous, of particulate material to be pressed into the space around the preheating portion of the rotor, rotation of the rotor causing frictional heat energy to be generated and supplied to the particulate material compressed thereagainst. The material moves axially through the preheating zone surrounding the preheating portion of the rotor and, due to the frictional heat generated between the material and the rotor, the material is heated. Since it requires some time for the material to travel the length of the preheating portion of the rotor, the material achieves a substantially uniform temperature at a selected value, usually only slightly below the plastification temperature. The material is then compressed against the conical plasticizing face whereupon substantial quantities of additional fractional heat are generated causing additional heating and rapid plastification of the material as it flows radially outwardly through the plasticizing zone. It then flows through the soaking chamber surroundng the enlarged cylindrical portion to a discharge opening.

DETAILED DESCRIPTION

Referring to FIG. 1, there is shown a plasticizing machine 11 illustrating a preferred embodiment of the present invention.

The plasticizing machine 11 comprises in general a housing 12 having a plasticizing rotor 13 rotatably mounted in one end thereof and a feed means 14 at the other end of the housing for supplying particulate plastic material to the rotor.

The housing 12 comprises a generally tubular feed barrel 16 having a cylindrical central opening 17 formed in one end thereof communicating with and coaxially aligned with an enlarged cylindrical opening or chamber 18 formed in the other end thereof. The cylindrical openings 17 and 18 are interconnected by a tapered seat portion 19 positioned intermediate the length of the cylindrical feed barrel 16. The housing 12 also has a feed opening 21 extending radially therethrough adjacent the rightward end thereof for allowing communication between exterior material feeding means, such as a hopper (not shown), and the central opening 17.

The end of the feed barrel 16 having the enlarged chamber 18 therein is substantially closed by means of an end plate 22, which end plate is tightly connected to the feed barrel 16 by means of a plurality of screws 23 or by any other suitable connection means. The feed barrel 16 is further provided with a discharge or outlet opening 26 extending radially therethrough adjacent the leftward end thereof, the outlet opening 26 communicating with the chamber 18.

The feed means 14 includes a pressure device, which in this embodiment is a ram 24 slideably disposed within the central opening 17, the extended position of the ram being illustrated in dotted lines in the drawing and the retracted position of the ram being illustrated in solid lines. In its retracted position, the forwardmost end of the ram 24 is positioned behind the feed opening 21 to permit particulate plastic material to be deposited in the central opening 17. Seal means, such as an O-ring 27, may be provided if desired between the ram 24 and the feed barrel 16 to seal off the central opening 17 from the atmosphere. The ram 24 is connected to any suitable reciprocating power means 28, which power means may comprise a fluid pressure power cylinder operated either hydraulically or pneumatically. The power cylinder 28 is preferably of the double-acting type to permit positive control over both the extension and the retraction of the ram 24.

The other end of the feed barrel 16 has the plasticizing rotor 13 rotatably mounted therein, which rotor is substantially axially aligned with and axially spaced from the ram 24. The plasticizing rotor comprises first, second, third and fourth coaxial portions 31, 32, 33 and 34, respectively.

The fourth, or bearing, portion 34 has an external diameter substantially equal to but slightly less than the interior diameter of the annular chamber 18 whereby the rotor is freely but snugly supported for rotation within the opening 18. A bleed seal groove 38 is formed on the periphery of said bearing portion 34 to seal the interior of the feed barrel 16 from the atmosphere by carrying a small quantity of plastic material therein as more completely illustrated and described in my prior U.S. Pat. No. 3,358,334.

A bearing shaft 34A projects from the bearing portion 34 and extends through and is rotatably supported in an opening 36 formed in the end plate 22. Suitable radial and thrust bearings 37 and 37A are provided as desired.

The bearing shaft portion 34A is provided with drive means, such as a gear 39 fixedly keyed thereto, which drive means is drivingly connected to a power source or motor 41 so as to rotatably drive the plasticizing rotor within the feed barrel. The motor 41 is preferably of the variable-speed type to permit the plasticizing rotor 13 to be rotatably driven at any selected speed, thereby permitting accurate control of the amount of frictional heat generated during the plasticizing operation. It will, of course, be obvious that the plasticizing rotor could be driven in any other suitable manner.

The third, or equalizing, rotor portion 33 rotates with the bearing portion and, as in this embodiment, is normally integral therewith. Said third rotor portion is of a smaller external diameter so as to define a reduced portion or shoulder 42 at the junction therebetween. The cylindrical portion 33 and the surrounding feed barrel 16 thus cooperate to define an elongated annular passageway 43, which passageway is in communication with the outlet opening 26 adjacent one axial end thereof.

The third rotor portion 33 is in this embodiment fixedly connected to the second, or plasticizing, rotor portion 32 which in turn rotates with, hereby being integral with, the first, or preheating, portion 31. The plasticizing portion has a tapered plasticizing face 46 thereon. The plasticizing face 46 is positioned substantially adjacent, but slightly spaced from, the tapered seat portion 19 formed on the feed barrel 16 so as to define an annular conical passageway 47 therebetween. The tapered plasticizing face 46 and the tapered seat 19 are each, at least within a few degrees, of substantially the same angular inclination although, if desired, the surfaces defining the passageway 47 may converge in the radially outward (leftward in the drawing) direction as shown in FIG. 2 and further detailed in my Pat. No. 3,358,334.

The first cylindrical portion 31 is of substantially smaller diameter than the third cylindrical portion 33 and is in this embodiment fixedly connected to the conical portion 46 adjacent the apex end thereof. The first cylindrical portion 31 is substantially axially elongated in proportion to its diameter and is positioned within the central opening 17. The cylindrical portion 31 is of smaller diameter than the central opening 17 to thereby define an axially elongated annular passageway 51 therebetween, one axial end of said passageway 51 being in communication with the conical annular passageway 47. If desired, the surfaces defining said passageway 51 may be arranged to cause an axial variation in the cross-sectional area of said passageway 51, such as a progressive convergence in the direction of material flow as illustrated by the passageway 51A of FIG. 2. The average radial width and cross-sectional area of the annular passageway 51 will however normally be larger than that of the conical annular passageway 47 (although they will usually be of the same size at the point of connection therebetween), in order to move the plastic material therethrough more slowly than in the conical passageway. Thus, the material at the highest temperature may move through the system the most rapidly. Of course, this feature of the design, as well as the specific contour of the passageways 51 and 47, may be freely modified to fit particular requirements of particular plastics.

The free end of the preheating rotor portion 31 is formed with a nose 52 thereon which can have either a conical or other configuration as desired.

As illustrated in the drawing, the annular passageways 43, 47 and 51 are continuously in communication so as to define a single axially elongated annular passageway between the rotor 13 and the housing 12, which elongated annular passageway functions as a preheating and plasticizing zone and has been designated generally by the reference numeral 53. Specifically, the passageway 51 functions primarily as a preheating zone, the passageway 47 functions primarily as a plasticizing zone, and the passageway 43 functions primarily as a soaking or temperature equalization zone.

OPERATION

While the plasticizing operation of the present invention may be sufficiently derived from the description given above, a brief description of the operation will be given below so as to assure a complete and clear understanding thereof.

Operation of the plasticizing machine 11 embodying the present invention is initiated with the gear 39 and the plasticizing rotor 13 rotating and with the feed ram 24 withdrawn to its rightward position as illustrated in the drawing. Material to be plasticized, which may be in a granular or powdered form, is fed from a hopper or external feed means through the feed opening 21 into the cylindrical opening 17. The feed ram 24 is then moved forwardly, leftwardly in the drawing) by application of pressure fluid to the power cylinder 28. The feed ram 24 forces material within the opening 17 forwardly into contact with the nose 52 formed on the cylindrical portion 31 of the plasticizing rotor 13, the material then successively passing through the annular passageways 51, 47 and 43 during which movement the material is preheated, plasticized and heated to a desired molding temperature, the plasticized material then leaving the zone 53 by means of the discharge opening 26.

Considering more in detail the plasticizing operation which occurs within the heating and plasticizing zone 53 as defined by the passageways 43, 47 and 51, granular or powdered plastic material is forced through the opening 17 into contact with the nose portion 52 of the rotor, the material then being forced radially outwardly into the annular passageway 51. The material initially contacting the nose portion 52 is granulated or powdered and remains substantially nonrotatably fixed with respect to the surrounding housing 12. However, since the rotor 13 is rotating at a relatively high speed, a substantial relative rotation exists between the nose portion 52 and the internal surface of the material positioned closely adjacent thereto. Further, since the ram 24 compresses the material against the nose portion 52 of the rotor, frictional heat is generated between the internal surface of the material and the surface of the nose portion 52. This heat is absorbed by the material and causes preheating of same as the material moves axially and radially outwardly past the nose portion into the passageway 51. The material within the axial passageway 51 is also in a compressed condition due to the pressure imposed by the ram 24 whereupon additional frictional heat is generated between the internal surface of the material and the periphery of the cylindrical portion 31, thereby causing additional heating of the material as it travels axially through the annular passageway 51.

Since the cylindrical portion 31 of the rotor is of a relatively small diameter, its peripheral speed against the plastic material is less than that in the conical plasticizing zone. Hence, the frictional heat generated thereby is of a limited nature and, while being sufficient somewhat to heat the material, is insufficient to heat the material to a high enough temperature so as to cause plastification thereof. Since the chamber 51 is substantially elongated in the axial direction, a sufficient time is required for the material to travel throughout the length thereof to permit the material in the chamber 51 to achieve a substantially uniform temperature therein.

The material exiting from the annular passageway 51 enters the conical annular passageway 47 whereby the material is compressed by the ram 24 against the conical face 46, which face is of a substantially large area. The conical portion 32 and the cylindrical portion 33, being of substantially greater diameter than the cylindrical portion 31, have a greater peripheral speed and accordingly cause the generation of greater quantities of frictional heat energy. The preheated material entering into the radially inner end of the conical passageway 47 is thus rapidly moved radially outwardly through the conical passageway 47 into the annular passageway 43 and through the annular passageway 43 to the outlet opening 26. In successively travelling through the conical passageway 47 and the axial passageway 43, the preheated particulate material is rapidly plasticized and heated to the desired molding temperature with the material then being rapidly discharged through the opening 26 to a suitable molding device 56.

By preheating the material with the small rotor portion 31, the material can be heated within the apparatus to a temperature level slightly below the temperature at which plastification occurs. The preheated material may thus, if desired, be supplied to the inlet end of the conical passageway 47 at substantially the plastification temperature, and, accordingly, it requires the generation of less frictional heat within the plasticizing zone to completely plasticize and heat the material to the molding temperature. This permits the material within the passageways 43 and 47 to be plasticized much more rapidly while simultaneously permitting more precise control over the amount of frictional heat energy generated. This results in less deterioration of the material.

Further, since less heat has to be supplied to the material within the passageways 43 and 47, the material can be moved through the passageways at a much faster rate whereupon a substantially larger quantities of material can be plasticized within predetermined time intervals.

In one specific embodiment of the invention utilizing an ABS plastic ("Cycolac" manufactured by Marbon division of Borg Warner Corporation, Chicago, Ill.) the ram was supplied with a batch of granular material of of approximately 400 ounces at room temperature. The temperature of the material within the annular passageway 51 as it approaches the conical passageway 47 was within the range of 270 to 300° F. The passageway 51 contained approximately 175 ounces of material. The material leaving the conical passageway 47 and entering the annular passageway 43 was at a temperature of about 450°, the desired molding temperature, and was then rapidly moved to the discharge opening 26. The annular passageway 43 was of a relatively small capacity and contained approximately 40 ounces of material, namely, approximately 10 percent of the overall batch. Thus, only a small portion of the batch is maintained at the elevated molding temperature, at which temperature most deterioration or degradation occurs. By having only a small quantity of material at the elevated temperature, this material can be quickly transferred to the injection device and thus the amount of degradation which occurs in the material is greatly minimized. However, in a batch operation, since approximately 50 percent of the overall batch is contained within the preheat zone, that is, within passageway 51, relatively large quantities of material can be plasticized within a relatively short time and with minimum degradation or deterioration of the material.

While the foregoing has shown and referred to a ram type feeding device for a batch operation, such as injection molding, much of the advantage of the invention can also be obtained with a screw type feed for a continuous, as extrusion, operation.

The embodiments of the invention in which an exclusive property or privilege is claimed are defined as follows:

1. An apparatus for plasticizing particulate plastic material comprising:

housing means having a cylindrical opening formed in one end thereof and an enlarged chamber in the other end thereof coaxially aligned and in communication with said opening, said enlarged chamber including a cylindrical portion having a diameter substantially larger than the diameter of said cylindrical opening;

rotor means disposed within said housing means for rotation relative thereto for causing preheating and plastification of particulate plastic material;

said rotor means including a substantially cylindrical, preheating rotor portion rotatably disposed within the cylindrical opening for causing preheating of particulate plastic material to a temperature below its melting temperature, said preheating rotor portion being of smaller diameter than said opening in said housing means to define an axially elongated annular preheating zone therebetween;

said rotor means further including a plasticizing rotor portion coaxial with and fixedly connected to the preheating rotor portion and disposed within the enlarged chamber for rotation relative to said housing means, the plasticizing rotor portion having a sloped surface thereon which increases in diameter from one axial end of the plasticizing rotor portion toward the other axial end thereof with the diameter of said other axial end being greater than the diameter of said cylindrical opening, and the one axial end of the plasticizing rotor portion being fixedly connected to an adjacent end of the preheating rotor portion;

said housing means having seat means secured thereto coaxial with said rotor means and spaced opposite and closely adjacent to said sloped surface, said seat means and sloped surface defining therebetween an axially elongated annular plasticizing zone which increases in diameter from the one axial end toward the other axial end of the plasticizing rotor portion, the radial thickness of said plasticizing zone being small throughout the entire length thereof;

said rotor means including a further substantially cylindrical, axially elongated rotor portion rotatably disposed within the cylindrical portion of said enlarged chamber, said further rotor portion being coaxial with said plasticizing rotor portion and having one axial end thereof fixedly connected to said other axial end of said plasticizing rotor portion, the adjacent ends of said further rotor portion and said plasticizing rotor portion having substantially equal external diameters, and said further rotor portion and the surrounding wall of said enlarged chamber cooperating to define an axially elongated, narrow annular passageway therebetween, said passageway having one axial end thereof in communication with the plasticizing zone;

drive means for causing relative rotation between said rotor means and said housing means; and feeding means for supplying particulate plastic material to said preheating zone and for forcing the material through said preheating zone into said plasticizing zone.

2. An apparatus according to claim 1, wherein the other axial end of said passageway is substantially closed, and outlet means communicating with said passageway substantially adjacent said other axial end for permitting plasticized material to exit therefrom in a single continuous stream.

3. An apparatus according to claim 1, wherein said sloped surface on said plasticizing rotor portion is conical, and wherein said housing means has a conical seat formed thereon closely adjacent to but spaced from said conical surface.

4. An apparatus according to claim 1, wherein said feed means includes a ram slideably disposed within said cylindrical opening for forcing particulate plastic material into the annular preheating zone.

5. An apparatus according to claim 4, wherein the preheating rotor portion has a free axial end disposed within said cylindrical opening and confronting said ram, the free axial end of said preheating rotor portion having a curved surface which diverges in the direction of material flow.

6. An apparatus according to claim 1, wherein the preheating rotor portion is provided with a slight taper on the axially elongated periphery thereof so as to define, in cooperation with the cylindrical opening, an axially elongated annular preheating zone of progressively changing cross-sectional area.

7. An apparatus according to claim 6, wherein the cross-sectional area of the preheating zone diminishes in the direction of material flow.

8. An apparatus according to claim 1, wherein the cross-sectional area of the annular preheating zone is greater than the cross-sectional area of the annular plasticizing zone.

9. An apparatus according to claim 1, wherein said rotor means includes a bearing rotor portion coaxially aligned with and fixedly connected to the other axial end of said further rotor portion, said bearing rotor portion having a diameter greater than the diameter of said further rotor portion and being snugly disposed within said housing means in rotatable and sealing relationship therewith for substantially closing said other axial end of said annular passageway.

References Cited

UNITED STATES PATENTS 2,763,896  9/1956  Vogt.
3,358,334  12/1967  Hendry.

FOREIGN PATENTS 144,014  1/1962  U.S.S.R.

WALTER A. SCHEEL, Primary Examiner

J. M. BELL, Assistant Examiner

U.S. Cl. X.R.

18—30; 264—329